E. H. MESSITER.
TONNAGE REGULATOR.
APPLICATION FILED MAR. 22, 1912.

1,125,705.

Patented Jan. 19, 1915.
2 SHEETS—SHEET 1.

WITNESSES:
William J. Sperl
L. H. Campbell

INVENTOR
Edwin H. Messiter
BY
E. W. Marshall
ATTORNEY

E. H. MESSITER.
TONNAGE REGULATOR.
APPLICATION FILED MAR. 22, 1912.
1,125,705.
Patented Jan. 19, 1915.
2 SHEETS—SHEET 2.
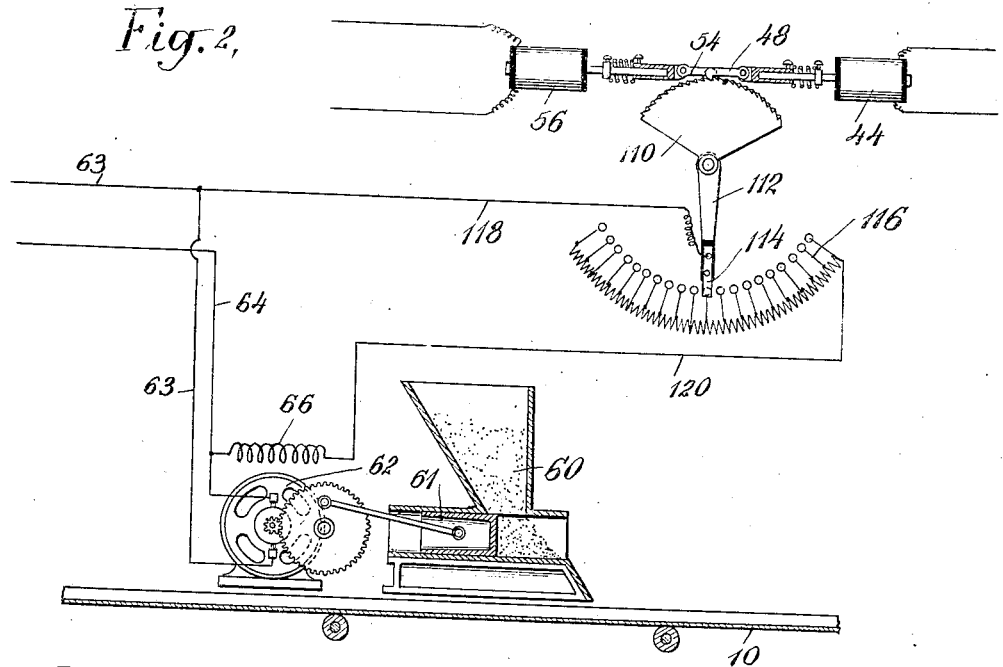
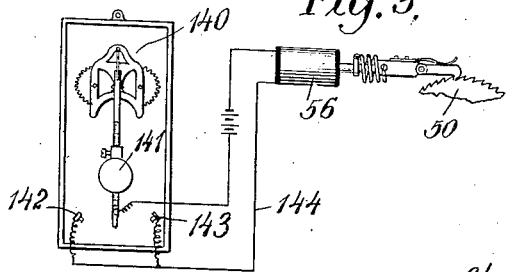
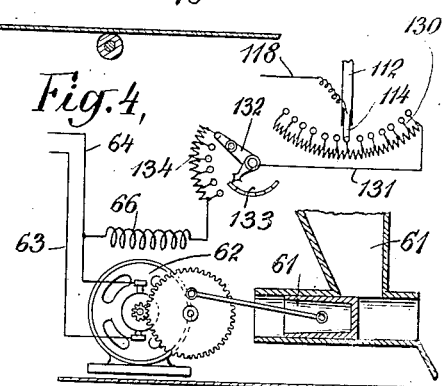
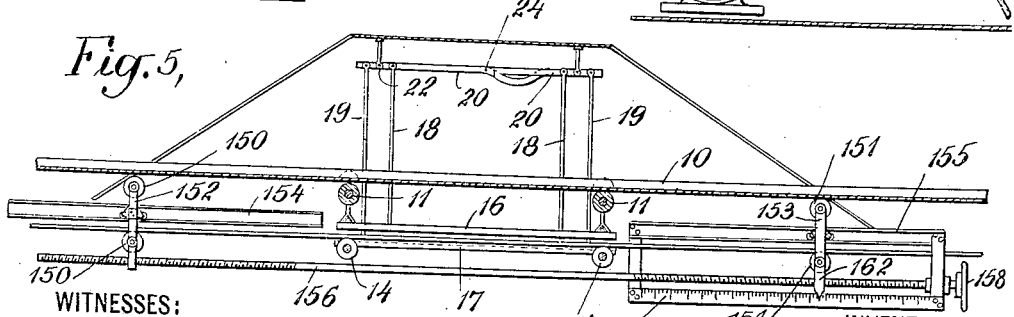
WITNESSES:
William J. Sperl
L. H. Campbell Jr.
INVENTOR
Edwin H. Messiter
BY
E. W. Marshall
ATTORNEY

UNITED STATES PATENT OFFICE.

EDWIN H. MESSITER, OF BROOKLYN, NEW YORK, ASSIGNOR TO ELECTRIC WEIGHING COMPANY, OF NEW YORK, N. Y., A CORPORATION OF NEW YORK.

TONNAGE-REGULATOR.

1,125,705.      Specification of Letters Patent.      Patented Jan. 19, 1915.

Application filed March 22, 1912. Serial No. 685,484.

*To all whom it may concern:*

Be it known that I, EDWIN H. MESSITER, a citizen of the United States of America, and a resident of Brooklyn, county of Kings, and State of New York, have invented certain new and useful Improvements in Tonnage-Regulators, of which the following is a specification, reference being had to the accompanying drawings, forming a part thereof.

This invention relates to improvements in a tonnage regulator or an apparatus for regulating the rate at which materials are carried over a conveyer, and more particularly in conjunction with means for continuously weighing material as it is being carried by a traveling belt conveyer, the total weight to be computed being determined by the speed of the belt as one of the factors and the weight of the material carried by the belt while passing a given point, as the other factor.

Accordingly, one feature of the invention contemplates the provision of means for automatically conveying a predetermined weight of material continuously at a predetermined rate.

A further feature of the invention relates to means whereby the amount of material conveyed may be varied.

In order that the invention may be thoroughly understood, I will describe an embodiment thereof, having reference to the accompanying drawings illustrating the same, and will then point out the novel features thereof in claims.

Figure 1:
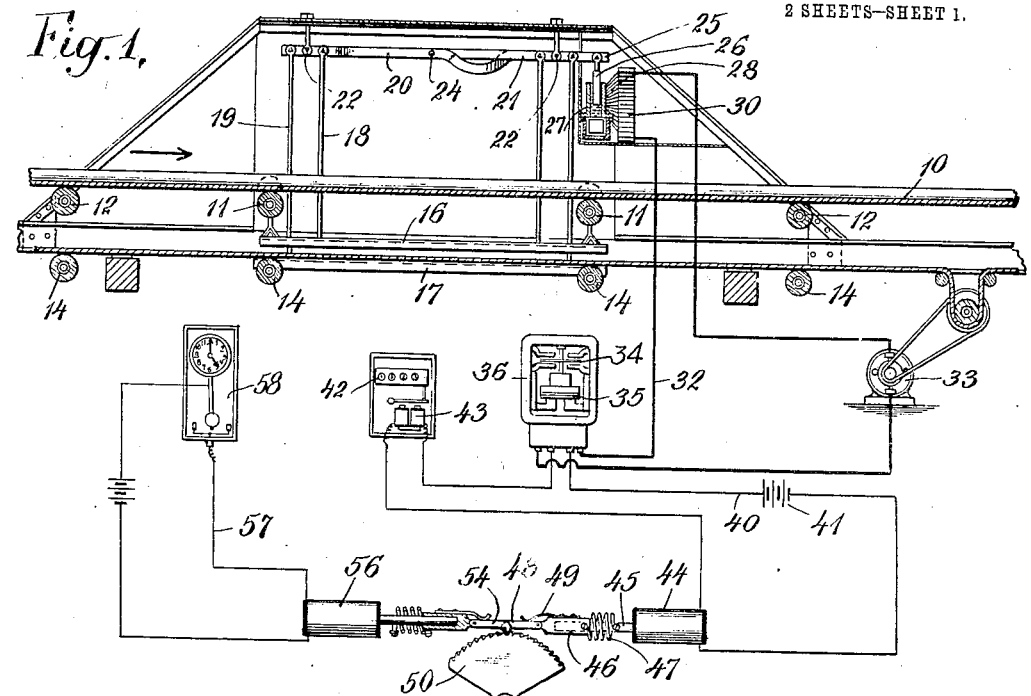
Figure 1:
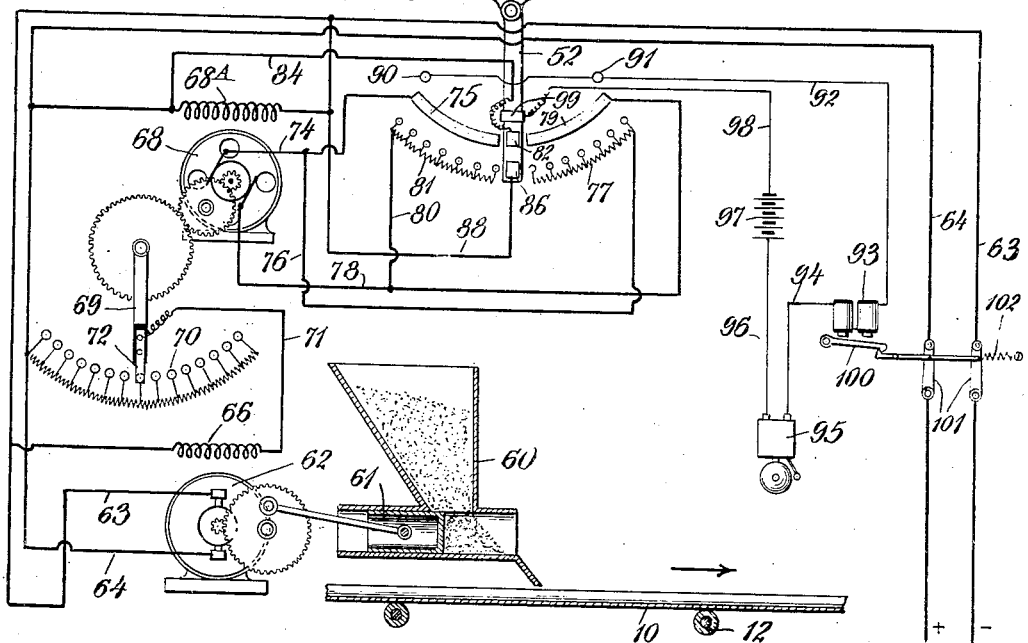

In the drawings, Figure 1 is a view in central vertical longitudinal section through a weighing machine constructed in accordance with my invention, showing diagrammatically the means for controlling the feeding of the material to the conveyer. Fig. 2 is a diagrammatic view showing a modified form of controlling mechanism in which the pilot motor may be omitted. Fig. 3 is a fragmentary view showing an arrangement for varying the load by varying the time element. Fig. 4 is a fragmentary view showing a manually actuated device for regulating or changing the speed of the motor. Fig. 5 is a longitudinal sectional view showing a means for varying the distance apart of the fixed supports for the weighing part of the conveyer to vary the weight of the load carried.

The traveling conveyer upon which the material to be weighed is carried is here shown in the form of an endless conveyer belt 10, the upper run of which is supported by suitable troughing pulleys 11—12 and the lower run of which is supported by ordinary cylindrical idler drums or pulleys 14. The two troughing pulleys 11 for the upper runway of the belt are carried by a frame 16, and two of the lower idler pulleys 14 are similarly carried by a frame 17 at the same distance apart. The frames 16 and 17 are connected respectively by means of links 18 and 19 with weighing levers 20—21. The connections of the links 18—19 are upon opposite sides of the fulcrums or points of support 22 of the weighing levers, whereby the two platforms will counterbalance each other and the empty belt portions will also be counterbalanced. This will leave only the weight of the material carried upon the active portion of the belt as tending to actuate the weighing lever. This method of counterbalancing is not claimed herein but is illustrated for the purpose of disclosing a complete operative machine. It is specifically described and claimed in my Patent No. 998,974 issued July 25, 1911.

The two levers 20—21 are caused to bear the one upon the other at a central point 24, and the lever 20 is provided with an extension 25 to the end of which is pivotally connected a plunger 26. This plunger enters a mercury bath contained in a casing 27. The plunger 26 is loaded so as to be heavy enough to descend in the bath of mercury the distance permitted by the tipping of said weighing levers or scale beams. The parts are so proportioned that the plunger 26 will be raised or lowered to an extent directly proportionate to the weight carried by the platform 16 in excess of that carried by the platform 17.

The movement of the plunger 26 varies the position of the mercury surface and thereby varies the amount of current permitted to pass through an electrical measuring instrument. This is done by inserting in the walls of the casing 27 a number of contact terminals at varying heights, each of said terminals being connected through suitable wires 28 with the various turns of a resistance coil 30. This resistance device is specifically described and claimed in my Patent No. 1,014,604 issued January 9, 1912.

In the embodiment shown in Fig. 1 the resistance 30 is arranged in a circuit 32 fed by a generator 33 and also including an ampere-hour meter 34. The speed of the generator 33 is arranged to be proportionate to the speed of movement of the conveyer belt. A convenient method of maintaining this proportion is to connect said generator in driving relation with a pulley in engagement with the conveyer belt.

In the arrangement of the circuit 32 as shown, the amount of current permitted to pass through the instrument 34 will be proportionate, first to the speed of the generator 33, and second, inversely to the amount of resistance interposed in the circuit. As the speed of the generator is proportionate to the speed of the conveyer belt, and the amount of resistance 30 interposed is proportionate to the movement of the plunger 26, which movement is determined by the weight of the material as it passes a given point, it will then follow that the rate of movement of the armature of the instrument 34 at any moment will be exactly proportionate to the weight carried and the speed at which it is carried past a given point at such moment.

The meter may be, if desired, arranged to be actuated by a current from a constant voltage supply instead of by the current from generator 33, in which case its rate of movement will depend only upon the weight of the load passing over the conveyer belt.

The meter 34 is of well known construction having a rotary shaft. Upon this shaft I have mounted a rotary disk 35 which is inclosed within a casing 36 and arranged as it rotates to close intermittently an auxiliary circuit 40 in which is a battery 41. The construction of a meter which may be used to control this circuit is specifically described and claimed in my copending application serially numbered 685,482 filed herewith. A registering device or counter 42 may be interposed in circuit 40 if desired which is arranged to be operated by a magnet 43 and energized when said circuit is closed by the movement of the meter 34. A coil 44 of a solenoid is also connected in the circuit 40 and operates on a core or plunger 45 which is slidably mounted at one end in a sleeve 46, and yieldingly connected to said sleeve by a spring 47. A pawl 48 is pivotally mounted on the outer end of said sleeve and is held in engagement with a toothed sector 50 by a spring 49. As the shaft of the meter 34 rotates the circuit 40 is closed and the coil 44 energized, which energization draws the core 45 into the solenoid and causes the pawl 48 to impart a slight rotary movement to the sector 50, and to a contact arm 52 connected therewith. Arranged to swing said sector in the opposite direction is a pawl 54 operated by a coil 56 in an auxiliary circuit 57, which also includes a battery, said circuit being arranged to be closed periodically by a time controlled device 58. The arrangement of the devices in the circuits 40 and 57 is such that when the conveyer is carrying the desired load at the desired rate the coils 44 and 56 are energized periodically in such relation that their effects on the contact arm 52 counteract each other so that they cause only a slight oscillation of said arm, but not sufficient to effect the motor circuit to be hereinafter described. If more impulses are imparted to one coil than to the other the arm 52 will be moved to one side or the other accordingly.

The sector 50 is provided with two sets of teeth oppositely inclined, or two sectors may be mounted side by side for coöperation with the pawls 48, 54 respectively. The resilient connections shown between the magnet cores and the pawls may be provided for the purpose of preventing simultaneous or nearly simultaneous pulls on the two magnets having any effect upon the contact arm 52.

The material is fed to the conveyer 10 in any suitable manner, a convenient means being shown as a hopper 60 having a plunger 61 reciprocated by a motor 62. The armature of the motor 62 is connected to conductors 63 and 64 of a circuit supplied from any suitable source of electrical energy. The motor 62 is provided with a shunt field 66 which is arranged to be varied by some means such for example as a pilot motor 68. This pilot motor has a shunt field coil 68$^A$ showing directly above it, and is connected by suitable gearing with a contact arm 69 which coöperates with a resistance device 70.

The field coil 66 is connected with the main 63 and its other terminal is connected by a conductor 71 to a contact 72 on the arm 69. The other end of the resistance device 70 is connected to the other main 64. One side of the armature circuit of the pilot motor 68 is connected by a conductor 74 with an arcuate contact 75, and by a conductor 76 with one end of a series of resistance coils 77. The other side of said armature circuit is connected by a conductor 78 with an arcuate contact 79, and by a conductor 80 with one end of a series of resistance coils 81. A contact 82 on the arm 52 coöperates with the contacts 75 and 79, and is connected by a conductor 84 with the main conductor 64. A contact 86 on the arm 52 coöperates with contacts of the resistances 77 and 81, and is connected by a conductor 88 with the main conductor 63.

Should the motor 62 feed the material from the hopper 60 too fast, the weight upon the belt would be greater than desired and this would exert an increased pressure on the frame 16 with a corresponding movement of the scale beams 20, 21 and the extension 25 and plunger 26 would be moved to vary the resistance in the circuit 32 to allow more current to pass through the latter. This would speed up the meter 34 and consequently operate the circuit controller in the casing 36 to increase the rate at which the circuit 40 is closed and coil 44 energized. The pawl 48 would thereupon move the sector 50, and the contact arm 52 would be swung to the left bringing the contact 82 in engagement with the arc-shaped contact 75 and the contact 86 is moved over the resistance 81. The pilot motor circuit is thus closed to move the contact arm 69 to the left over the resistance 70 to strengthen the field of the motor 62 so as to reduce its speed, thereby reducing the rate at which the material is fed onto the belt. On the other hand, if the material is being fed too slowly by the motor 62, the weight on the frame 16 will be reduced, and the extension 25 and plunger 26 will be raised, thus varying the resistance 30 to reduce the amount of current flowing through the circuit 32. This would reduce the speed of the meter 34 and consequently the rate at which the impulses are sent through the coil 44 in the circuit 40. The impulses sent through the coil 56 in the circuit 57 would therefore be more rapid than those in the coil 44, and the sector 50 would be moved to swing the contact arm 52 to the right thereby closing the pilot motor armature circuit through the contact 79, and vary the resistances 77 and 70 to speed up the main motor 62. When the weight of material fed onto the belt is restored to normal, the parts are returned to normal position. The resistances 77 and 81 are provided for the purpose of varying the speed of the pilot motor. If the arm 52 is moved but slightly to one side or the other the pilot motor will rotate slowly and thus affect the speed of motor 62 slowly. But if it is moved farther the pilot motor will swing arm 69 more rapidly and will consequently change the speed of motor 62 more quickly and to a greater extent.

In case the unbalancing should become excessive so that it would be necessary to stop the operation of the device, a safety device is provided to automatically open the feed circuit to the motors and also to sound an alarm. To accomplish this a pair of contacts 90, 91 are provided, connected by a conductor 92 to one of the coils of an electromagnet 93, the other of said coils being connected by a conductor 94 to an electric bell. The bell 95 is connected by a conductor 96 to one pole of a battery 97, the other pole of which is connected by a conductor 98 to a contact 99 on the arm 52. The magnet 93 is provided with an armature 100 which serves as a latch for a switch 101 which connects the leads 63 and 64 with the supply of energy for operating the motors. When the contact arm 52 is operated sufficiently to cause it to engage either of the contacts 90 91, the circuit through the magnet 93 is closed, thereby drawing the latch 100 out of engagement with the switch 101, allowing the switch 101 to be opened by the spring 102 and the bell 95 is simultaneously caused to ring.

In the embodiment shown in Fig. 2, the pilot motor is omitted, the variable resistance for the shunt field of the main motor being directly controlled by a contact arm operated by the magnets 44 and 56. These magnets cause the pawls 48 and 54 to operate on a sector 110 of a contact arm 112. The arm 112 carries a contact 114 adapted to move over and engage the contacts of a variable resistance 116. The contact 114 is connected by a conductor 118 to the conductor 63 of the main circuit, and one end of the resistance 116 is connected by a conductor 120 to one end of the shunt field coil 66 of the motor 62, the other end of said shunt field being connected to the conductor 64. The motor 62 operates on the plunger 61 in the hopper 62, in the manner already explained.

The weight of material carried by the belt can be varied in several ways. For example it may be changed by varying the electrical resistance of the shunt field circuit, by varying the rate of the impulses in one of the auxiliary circuits, or by varying the distance between the stationary supports of the portions of the conveyer, which pass over the platform 16 and 17.

The first method is shown in Fig. 4, in which the contact 114, carried by the arm 112 coöperates with a variable resistance 130. One end of the resistance 130 is connected by a conductor 131 to a pivoted contact arm 132, which is provided with an index 133, and is arranged to be moved manually over a variable resistance 134, one end of said resistance being connected to the shunt field coil 66. By manually moving the arm 132 the resistance of the shunt field coil circuit may be varied, and consequently the normal speed of the main motor 62 is thereby varied.

The second method is shown in Fig. 3, in which a circuit controlling device 140 is provided having a swinging pendulum 141 which can be adjusted to vary its rate of vibration. This pendulum is arranged to engage contacts 142, 143 arranged in a circuit 144 which includes the coil 56. By varying the length of the pendulum 141, its rate of oscillation is varied, and consequently the impulses in the circuit 144 through the coil 56 are accordingly varied, to vary its action on the sector 50.

The third method is shown in Fig. 5 in which the active upper portion of the conveyer belt 10 is supported between pulleys 150, 151 mounted on carriages 152, 153 which are adjustable along beams 154, 155. The carriages 152, 153 are threaded at their lower ends upon a right and left-hand threaded screw 156 provided with a hand-wheel 158. A scale 160 is provided over which a pointer 162 on the carriage 153 passes. By turning the screw 156 so that the pulleys 150 and 151 are caused to approach the length of the active portion of the belt is reduced. Thus, a shorter portion of the belt will act upon the weighing mechanism and consequently the total weight carried by the belt in a given time will be increased. If the pulleys 150, 151 are drawn apart, a larger portion of the belt will act upon the weighing mechanism, and the total load carried by the conveyer consequently decreased.

I have illustrated and described several modifications and embodiments of my invention to show that it is not limited to any specific form or construction.

What I claim is:

1. A conveyer, an electric circuit, means for proportioning the current in said circuit in acordance with the weight of the material being transported, and means controlled by said current for regulating the weight of material transported.

2. A conveyer, an electric circuit, means for proportioning the current in said circuit in accordance with the weight of the material and the speed at which it is being transported, and means controlled by said current for regulating the weight of material transported.

3. A conveyer, an electric circuit, means for proportioning the current in said circuit in accordance with the weight of the material on the conveyer and the speed at which it is being transported, and means automatically controlled by said current for maintaining a predetermined rate of discharge of material from the conveyer.

4. A conveyer, an electric circuit, a device arranged to be actuated by a load on said conveyer and arranged to vary the current passing through said circuit in accordance with the weight of a moving load, and means controlled by said current for automatically regulating the rate of discharge of the material from the conveyer.

5. A conveyer, an electric circuit, a device arranged to be actuated by a load on said conveyer and arranged to proportion the current in said circuit in accordance with the weight of the material and the speed at which it is being transported, and means controlled by said current for varying the load transported by said conveyer.

6. A conveyer adapted to receive a load, an electric circuit, means operatively related to the conveying means for supplying a current to said circuit, the said current having an electro-motive force proportioned to the speed of operation of the load conveying means, means for varying the current in the said circuit in accordance with variations in the weight of the load being conveyed, means for feeding material on to the conveying means, and means controlled by said current for controlling the operation of the feeding means.

7. A conveyer, a device arranged to be operated upon by the load on said conveyer for weighing the load, means for feeding material to said conveying means comprising a motor, and means for automatically varying the speed of said motor by said weighing device.

8. A conveyer, a device arranged to be operated upon by a load on said conveyer for weighing the load, an electric circuit, arranged to be varied by said weighing device, means for feeding material to said conveying means, and means controlled by said circuit for regulating the operation of said feeding means.

9. A conveyer, a device arranged to be operated upon by a load on said conveyer for weighing the load, an electric circuit, means for proportioning the current in said circuit in accordance with the weight of the material and the speed at which it is being transported, and means for feeding material to said conveying means; a device controlled by the current in said circuit arranged to vary the rate of action of said feeding means, another circuit, a time element arranged to control said other circuit, and a second device in said other circuit arranged to vary the rate of action of the feeding means in opposition to the effect of said first rate varying device.

10. A belt conveyer, a weighing device in a section of the upper portion thereof and in a similar section of the lower portion thereof arranged to be acted upon by material carried by the conveyer over said sections of the conveyer, means for feeding material to said conveyer, and means for automatically controlling the feeding means by said weighing device.

11. A belt conveyer, a weighing device in a section of the upper portion thereof and in a similar section of the lower portion thereof arranged to be acted upon by material carried by the conveyer over said sections of the conveyer, means for feeding material to said conveyer, a motor for actuating said feeding means, and means controlled by said weighing device for controlling the motor.

12. A conveyer, a device arranged to be acted upon by the load on said conveyer as it passes a given point, means for feeding material to said conveying means, an electric motor for operating said feeding means, and means controlled by said device for varying the field of said motor to control its speed.

13. A conveyer, a device arranged to be operated upon by a load on said conveyer, for continuous weighing of the load, means for feeding material to said conveying means, an electric motor for operating said feeding means, a variable resistance in the field circuit of said motor, a pilot motor for varying said resistance, and means for controlling the operation of said pilot motor.

14. A conveyer, a device arranged to be operated upon by a load on said conveyer for weighing the load, a circuit, a resistance therein, a meter in said circuit arranged to intermittently close a secondary circuit, a secondary circuit controlled by said meter, means for feeding material to the conveying means, and means for controlling the speed of the feeding means, said controlling means being governed by variations in the rate of current impulses in said secondary circuit.

15. A conveyer, a device arranged to be operated upon by a load on said conveyer, mechanism for weighing the load carried on a portion thereof, and means for varying the length of said portion.

16. A conveyer, a device arranged to be operated upon by a load on said conveyer as it passes a given point, means for feeding material to said conveyer, manual means for adjusting the sensitiveness of said device, an electric motor for operating said feeding means, and means for varying the speed of said motor by said device.

17. A conveyer, a device arranged to be operated upon by a load on said conveyer as it passes a given point, means for feeding material to said conveyer, a motor operating said feeding means, adjustable clock mechanism adapted to vary the field and control the speed of said motor, means for adjusting the sensitiveness of said device, said mechanism and last mentioned means being in opposed relation to each other.

18. A conveyer, a weighing device comprising means for weighing the material carrying portion thereof, and means for so supporting an empty portion of the conveyer as to cause it to act counter to the material carrying portion, means for feeding material to said conveyer, a motor for actuating said feeding means, and means controlled by said weighing device for controlling the motor.

19. A conveyer, a device arranged to be operated upon by a load on said conveyer as the load passes a given point, an electric circuit, a generator in said circuit arranged to be driven at a speed proportional to that of the conveyer, a rheostat in the circuit arranged to be varied by said load operated device, mechanism for feeding material to said conveyer, and means controlled by the current in said circuit for varying the speed of the feeding mechanism.

20. A conveyer, a device arranged to be operated upon by a load on said conveyer for weighing the load, a circuit, a resistance therein, a meter in said circuit arranged to intermittently close a secondary circuit, a secondary circuit controlled by said meter, means for feeding material to the conveying means, and means for controlling the speed of the feeding means, said controlling means being governed by variations in the rate of current impulses in said secondary circuit and means controlled by said device for stopping the feeding means.

In witness whereof, I have hereunto set my hand this 15th day of March 1912 in the presence of two subscribing witnesses.

EDWIN H. MESSITER.

Witnesses:
F. B. GRAVES,
ERNEST W. MARSHALL.